US007055886B2

(12) United States Patent
Guiles

(10) Patent No.: US 7,055,886 B2

(45) Date of Patent: Jun. 6, 2006

(54) LOW-PROFILE HIGH-STRENGTH VEHICLE DOOR BEAM

(75) Inventor: Melvin J. Guiles, West Olive, MI (US)

(73) Assignee: Shape Corporation, Grand Haven, MI (US)

( * ) Notice: Subject to any disclaimer, the term of this patent is extended or adjusted under 35 U.S.C. 154(b) by 0 days.

(21) Appl. No.: 10/772,607

(22) Filed: Feb. 5, 2004

(65) Prior Publication Data

US 2004/0189043 A1 Sep. 30, 2004

Related U.S. Application Data

(63) Continuation of application No. 10/402,462, filed on Mar. 28, 2003, now abandoned.

(51) Int. Cl.
*B60J 5/00* (2006.01)

(52) U.S. Cl. ...................... 296/146.6; 228/146; 228/17

(58) Field of Classification Search ............ 296/146.6, 296/187.12, 190.03, 146.5, 193.05; 52/731.8, 52/790.1, 735.1; 29/897.2; 188/377
See application file for complete search history.

(56) References Cited

U.S. PATENT DOCUMENTS 4,090,734 A 5/1978 Inami et al.
4,307,911 A 12/1981 Pavlik
4,684,166 A 8/1987 Kanodia
4,796,946 A 1/1989 Wilson et al.
5,080,427 A * 1/1992 Sturrus et al. ........... 296/146.6
5,232,261 A 8/1993 Kuroda et al.
5,277,470 A 1/1994 Freeman et al.
5,395,036 A * 3/1995 Sturrus ....................... 228/146
5,404,690 A 4/1995 Hanf
5,454,504 A * 10/1995 Sturrus ........................ 228/17
5,466,032 A * 11/1995 Clausen et al. .......... 296/146.6
5,527,082 A * 6/1996 Topker et al. ........... 296/146.6
5,566,874 A * 10/1996 Sturrus ........................ 228/17
5,580,120 A * 12/1996 Nees et al. .............. 296/146.6
5,692,797 A 12/1997 Dancasiu
5,727,826 A * 3/1998 Frank et al. ............. 296/146.6
5,755,484 A * 5/1998 Chou et al. .............. 296/146.6
5,756,167 A * 5/1998 Tamura et al. ........... 296/146.6
5,785,376 A * 7/1998 Nees et al. .............. 296/146.6
5,813,594 A * 9/1998 Sturrus ....................... 228/146
5,813,718 A * 9/1998 Masuda et al. .......... 296/146.6
5,887,938 A * 3/1999 Topker et al. ........... 296/146.6
5,926,930 A 7/1999 Tamura et al.
5,934,544 A * 8/1999 Lee et al. .................. 29/897.2
5,987,821 A * 11/1999 Heim et al. .............. 296/146.5
5,992,922 A 11/1999 Harbig et al.
6,003,912 A * 12/1999 Schonhoff et al. .......... 293/122
6,065,797 A * 5/2000 Shirasaka ................ 296/146.6
6,096,403 A 8/2000 Wycech (Continued)

FOREIGN PATENT DOCUMENTS

DE 9200388 4/1992

(Continued)

*Primary Examiner*—Kiran B. Patel
(74) *Attorney, Agent, or Firm*—Warner Norcross & Judd

(57) ABSTRACT

A vehicle door beam of relatively small profile and high strength. The door beam is fabricated from a web and includes a beam portion and brackets extending from opposite ends of the beam portion. The beam portion includes two lateral portions of the web rolled inwardly into closed configurations, and the two lateral edges of the lateral portions are welded to the beam portion. In an alternative embodiment, a second web is included in the beam portion and is part of both of the closed configurations.

11 Claims, 9 Drawing Sheets

224
212
222
226
228
SECOND WELD
254
250
252
FIRST WELD
230
220

U.S. PATENT DOCUMENTS 6,141,935 A 11/2000 Artner et al.
6,145,271 A * 11/2000 Kossmeier et al. ...... 296/146.6
6,217,089 B1 * 4/2001 Goto et al. ................. 293/102
6,227,609 B1 * 5/2001 Mellis ..................... 296/146.6
6,240,820 B1 * 6/2001 Sturrus et al. ................ 83/188
6,290,282 B1 9/2001 Hortlund et al.
6,332,302 B1 * 12/2001 Asai ........................ 296/146.6
6,428,080 B1 * 8/2002 Ochoa ..................... 296/146.6
6,454,884 B1 * 9/2002 McNulty et al. ............ 148/520
6,508,035 B1 * 1/2003 Seksaria et al. ......... 296/146.5
6,591,576 B1 * 7/2003 Iida et al. .................. 52/735.1
6,591,577 B1 * 7/2003 Goto et al. .............. 296/146.6
6,592,158 B1 * 7/2003 Kettler et al. ............... 293/120

FOREIGN PATENT DOCUMENTS

DE 42 24 303 * 1/1994
EP 0 577 235 * 1/1994
FR 0 577 235 * 6/1993
JP 4238725 8/1992
JP 09141368 6/1997
JP 11059181 3/1999
JP 11227459 8/1999

* cited by examiner

LOW-PROFILE HIGH-STRENGTH VEHICLE DOOR BEAM

This application is a continuation of application Ser. No. 10/402,462 filed Mar. 28, 2003 now abandoned.

BACKGROUND OF THE INVENTION

The present invention relates to vehicle door beams and more particularly to one-piece vehicle door beams.

Vehicle door beams are widely used in the automotive industry to enhance the impact strength of vehicle doors and thereby to enhance passenger safety. Door beams can be manufactured as a single piece. Examples of one-piece beams produced by roll forming are illustrated in U.S. application Ser. No. 09/822,658 filed Mar. 30, 2001 by Nees and U.S. Pat. No. 5,756,167 issued May 26, 1998 to Tamura et al. Examples of one-piece beams produced by stamping or pressing are illustrated in U.S. Pat. No. 5,813,718 issued Sep. 29, 1998 to Masuda et al and Japanese Patent Publication 4-23 8725 dated Aug. 26, 1992. While these door beams represented advancements in the art, artisans continue to seek door beams of the desired strength, but with smaller profiles, less material, and/or increased ease of manufacture.

SUMMARY OF THE INVENTION

The aforementioned need is met in the present invention in which a door beam provides a relatively low profile and ease of manufacture, while still meeting the strength requirements of government regulations and vehicle manufacturers. More specifically, the door beam includes a web having two lateral portions rolled into and secured in closed configurations.

In various embodiments, the lateral edges of the lateral portions are connected to various other portions of the door beam. In a first embodiment, the lateral edges are welded to a central portion of the web adjacent one another. In a second embodiment, one lateral edge is welded to a central portion of the web, and the other lateral edge is welded to the first lateral portion along a line separate from the one lateral edge. In a third embodiment, an additional web or leg is secured within the beam, and either or both lateral edges are secured to the additional web.

The defined door beam provides improved strength, enabling reduced profiles and/or lengths. Accordingly, the door beam is usable in a wide variety of applications.

In a preferred embodiment, mounting brackets are integrally formed with the door beam. Such mounting brackets are relatively wide, providing additional options for securing the door beam within a vehicle door.

In another preferred embodiment, the door beam is roll formed. As is known in the art, the door beam can be given a "sweep" or curve, providing additional application options.

These and other objects, advantages, and features of the invention will be more fully understood and appreciated by reference to the detailed description of the preferred embodiments and the drawings.

DETAILED DESCRIPTION OF THE PREFERRED EMBODIMENTS

I. Preferred Embodiment

Figure 1:
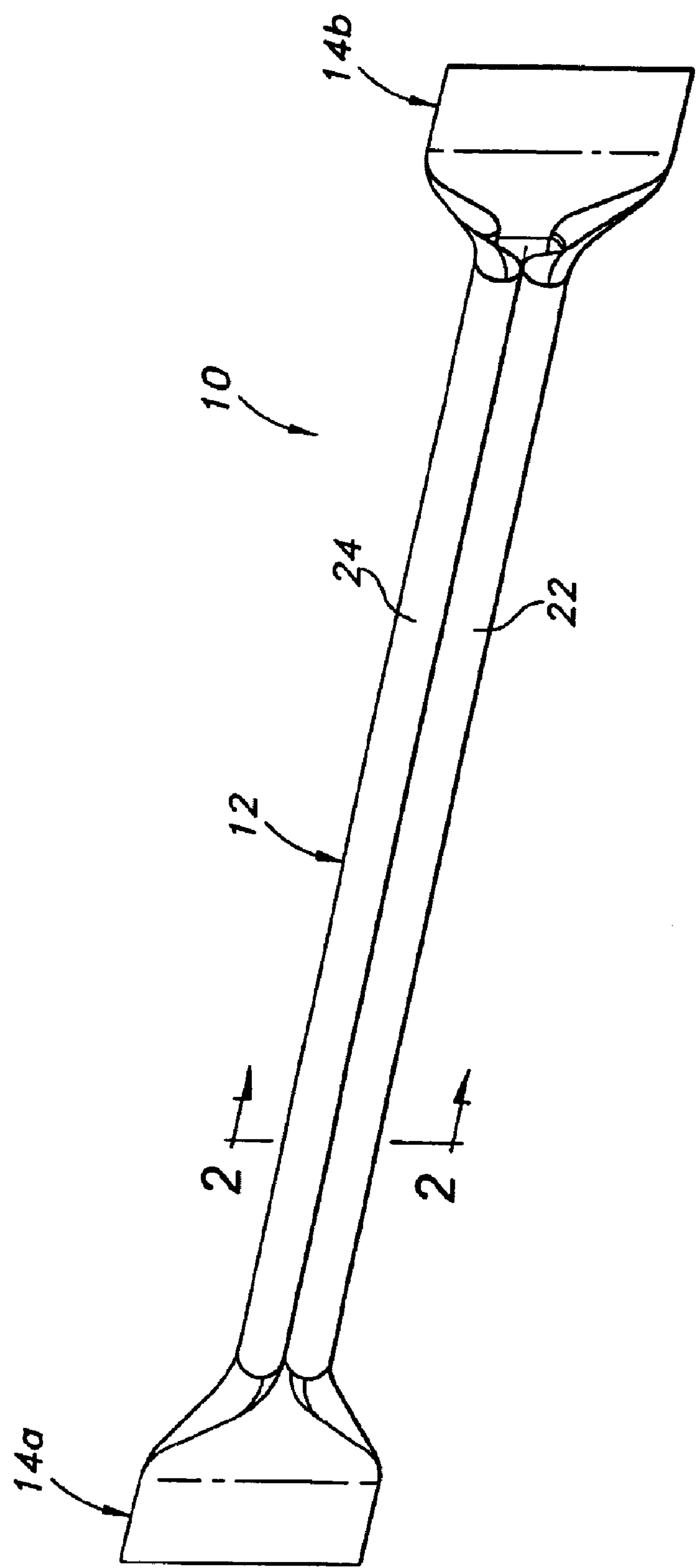
FIG. 1 is a perspective view of the door beam of the present invention.
Figure 2:
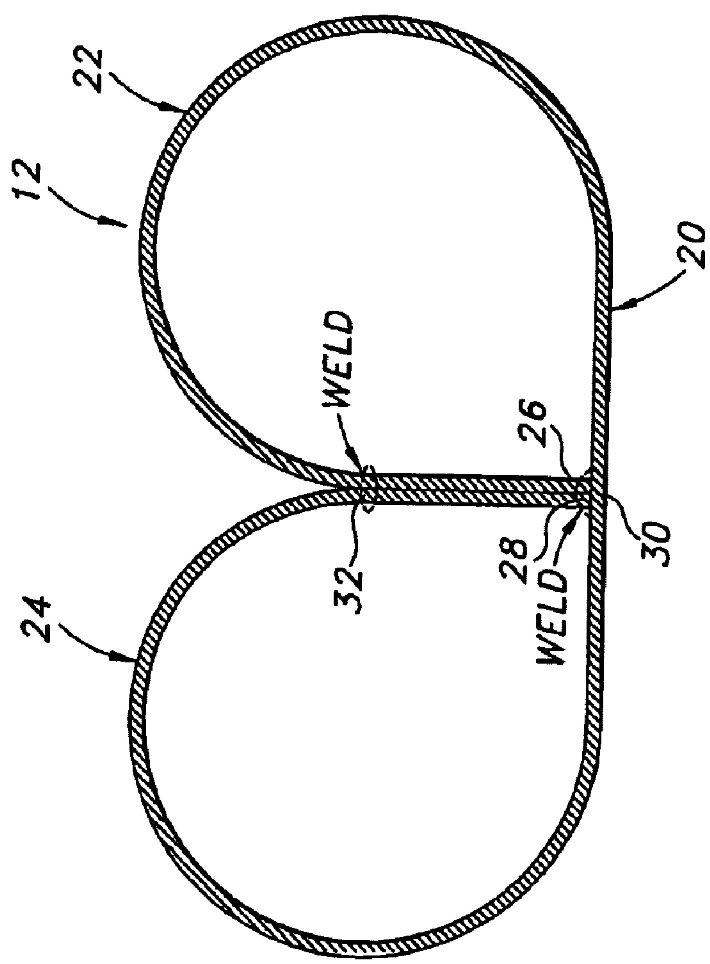
FIG. 2 is a sectional view taken along line II—II in FIG. 1.

A door beam constructed in accordance with a preferred embodiment of the invention is illustrated in FIGS. 1 and 2 and generally designated 10. The door beam includes a beam portion 12 and a pair of brackets 14*a* and 14*b* extending from the opposite ends of the beam portion. In the disclosed embodiment, the beam 12 and the brackets 14 are fabricated from a single piece of steel. A wide variety of steels and other suitable materials can be used and will be apparent to those skilled in the art.

The beam portion includes a web 20 which includes a first lateral portion 22 and a second lateral portion 24. The first and second lateral portions include first and second lateral edges 26 and 28, respectively. The first lateral portion 22 forms a closed configuration in which the lateral edge 26 engages a central portion 30 of the web 20, and the second lateral portion 24 forms a closed configuration in which the lateral edge 28 also engages the central portion 30 of the web 20. Both of the lateral edges 26 and 28 are welded or otherwise connected to the central portion 30 of the web 20. As an option, the first and second lateral portions 22 and 24 additionally can be welded together along a line 32 which is separate from the lateral edges 26 and 28. The first and second lateral portions are of similar or generally equal size and result in closed configurations of similar or generally equal size and shape.

The vehicle door beam 10 is fabricated using well-known roll forming techniques. As noted in the Background, the concept of a one-piece vehicle door beam is known in the art, and the specific techniques and steps need not be described in detail.

Figure 3:
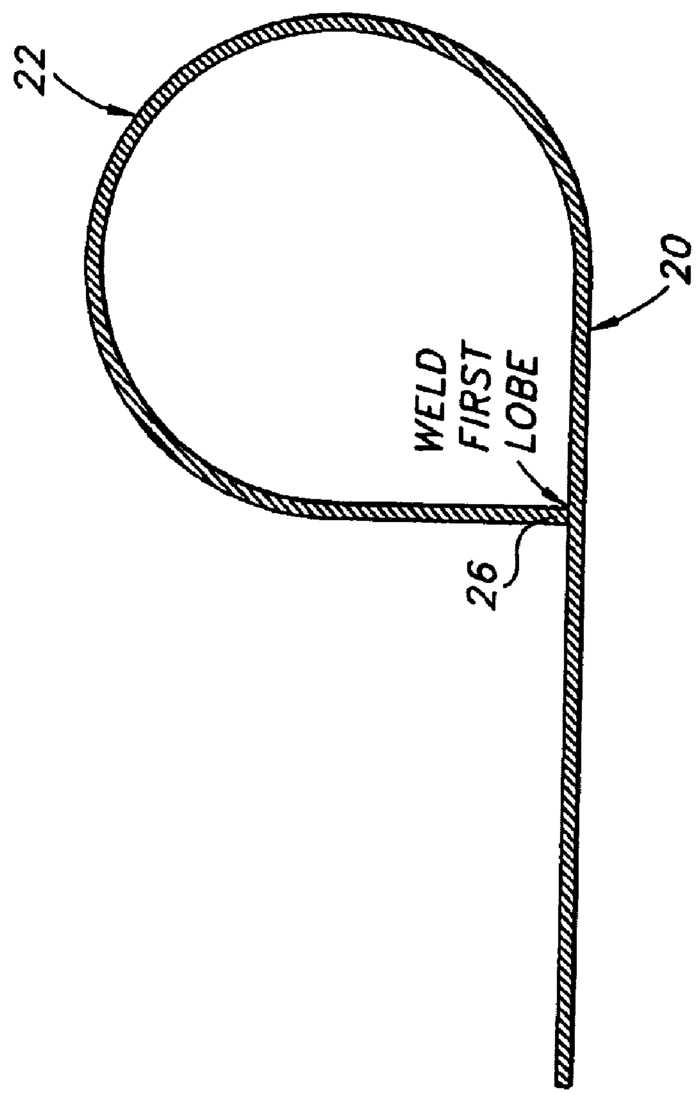
FIG. 3 is a sectional view similar to FIG. 2 but in an intermediate step of manufacture.

As illustrated in FIG. 3, a first step is to roll the first lateral portion 22 upon itself to form a closed configuration in which the lateral edge 26 engages or abuts the web 20. The edge 26 is welded to the web to secure the closed configuration. In a second step, the second lateral portion 24 is rolled into a closed configuration in which the lateral edge 28 also engages or abuts the web 20 in a location adjacent the first lateral edge 26. The second lateral edge 28 is welded in position to provide the cross-sectional shape illustrated in FIG. 2. Optionally, the first and second lateral portions can be welded together along the line 32.

The present specification uses "welding" to describe the connection of the metal-to-metal connections. Of course, other suitable attachment techniques now know or later developed can be readily substituted for welding. And, the particular attachment techniques will depend on a variety of considerations including material and cost. In all of the welding operations of the disclosed embodiments, the weld can be continuous, intermittent (i.e. a stitch weld), or other series of welds along a line.

II. First Alternative Embodiment

Figure 4:
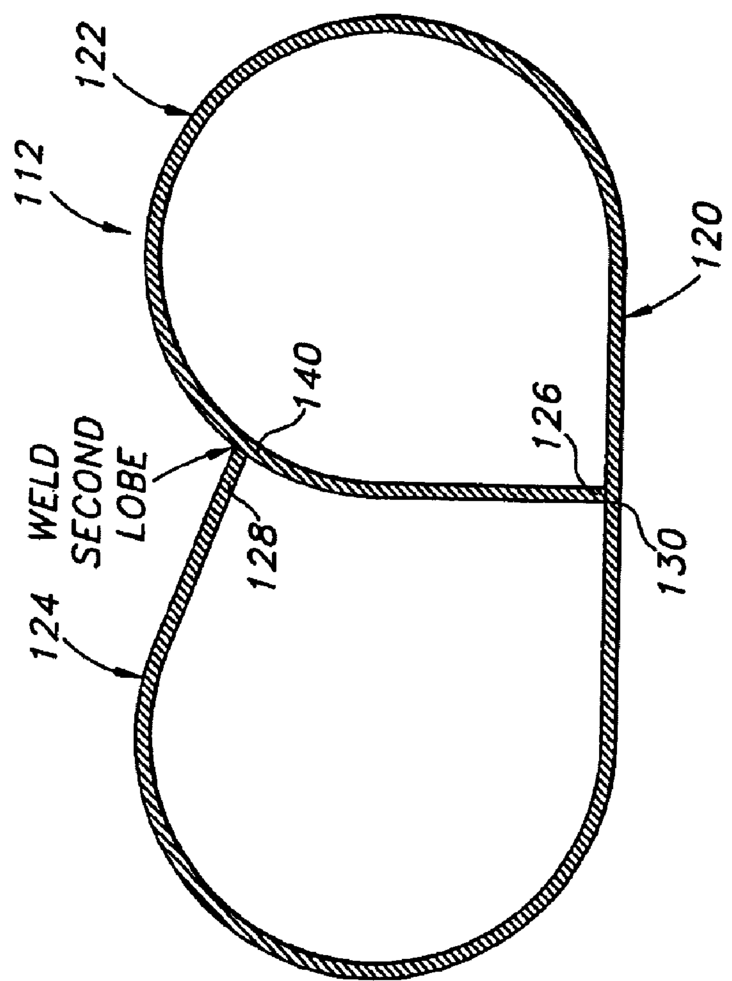
FIG. 4 is a sectional view similar to FIG. 2 showing a first alternative embodiment.

A first alternative embodiment 112 of the vehicle door beam is illustrated in FIG. 4. The beam portion 112 includes a web 120 having a pair of lateral portions 122 and 124. The first lateral portion 122 is generally identical to the first lateral portion 22 described in the preferred embodiment. The second lateral portion 124 is different in that its lateral edge 128 engages the second lateral portion 122 along a line 140 that is separate from the first lateral edge 126. The second lateral edge 128 is welded in position along line 140.

The manufacturing process to create the beam portion 112 is generally similar to that described above in conjunction with beam portion 12.

III. Second Alternative Embodiment

Figure 5:
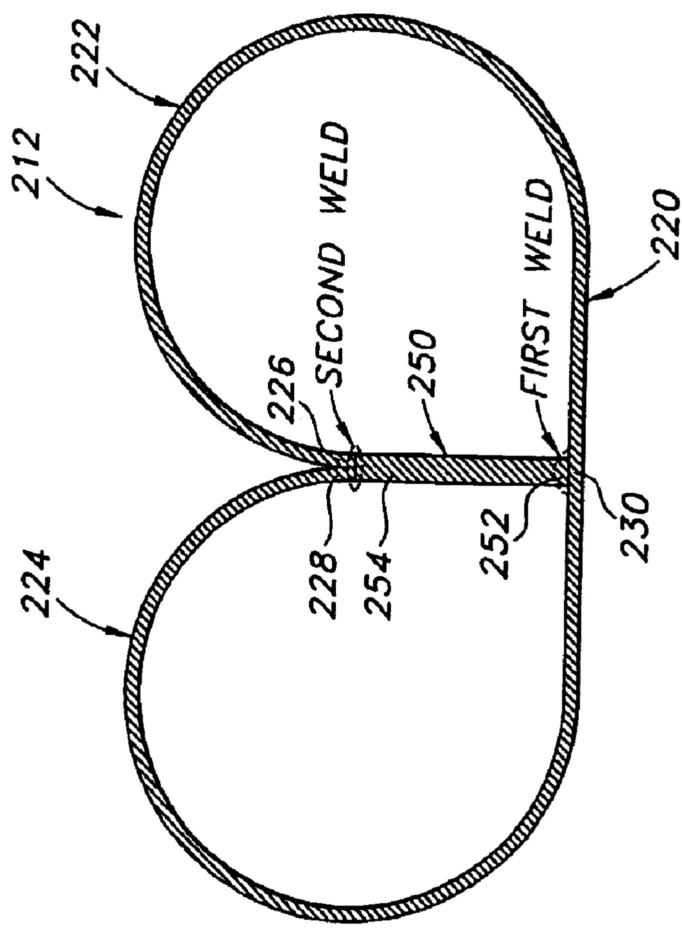
FIG. 5 is a sectional view similar to FIG. 2 showing a second alternative embodiment.

A second alternative embodiment 212 of the beam portion is illustrated in FIG. 5. As with the previous embodiments, the beam portion 212 includes a web 220 having first and second lateral portions 222 and 224. In addition, the beam portion 212 includes an additional web or leg 250 having opposite first and second edges 252 and 254. The first lateral edge 252 is welded to the central portion 230 of the web 220. The first and second lateral edges 226 and 228 are welded to the second edge 254 of the leg 250.

Figure 6:
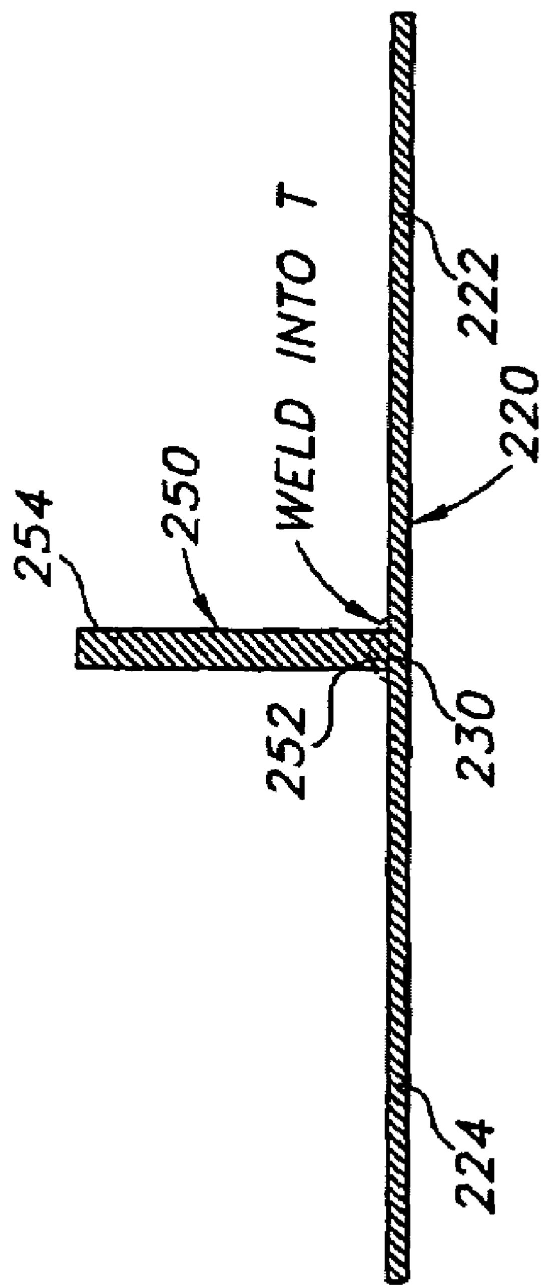
FIG. 6 is a sectional view similar to FIG. 5 but in an intermediate step of manufacture.

Again, the manufacturing techniques used to fabricate the beam 212 are generally similar to those described above. As a specific step illustrated in FIG. 6, the leg 250 is attached to the web 220 at the central location 230. In subsequent manufacturing steps (not illustrated), the first and second lateral portions 222 and 224 are rolled into closed configurations engaging and connected to the second edge 254 of the leg 250 to complete the construction illustrated in FIG. 5.

IV. Third Alternative Embodiment

Figure 7:
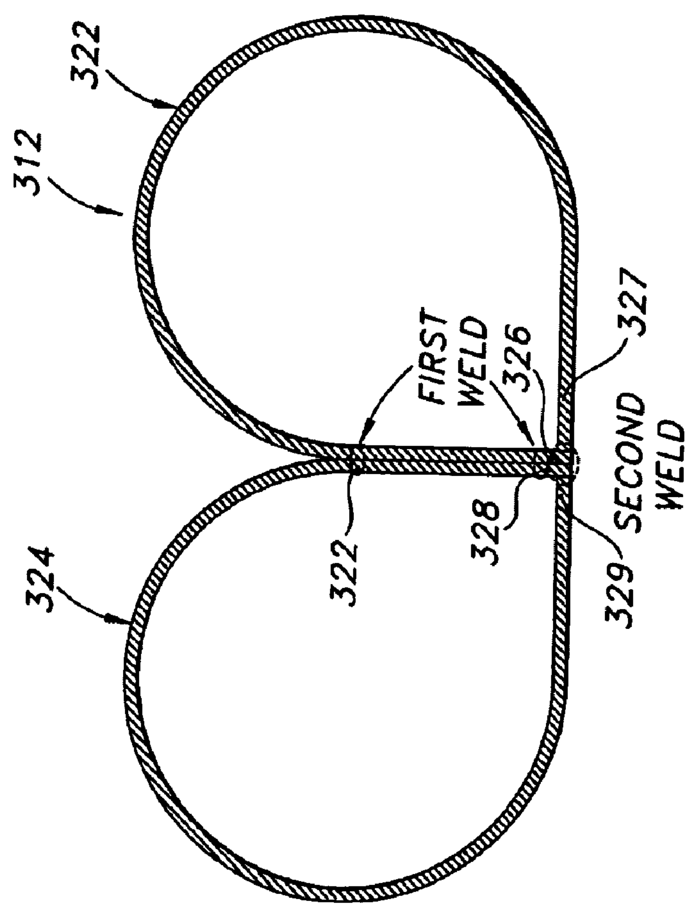
FIG. 7 is a sectional view of a third alternative embodiment.

A third alternative embodiment 312 of the vehicle door beam is illustrated in FIG. 7. The beam portion 312 includes a first lateral portion 322 and a second lateral portion 324. The two lateral portions 322 and 324 are not part of a single web, but rather are separate connected pieces. The first lateral portion 322 is a closed configuration wherein the lateral edge 327 engages and is welded to the lateral edge 326, and the second lateral portion 324 is a closed configuration in which the lateral edge 329 engages and is welded to the lateral edge 328. Additionally, the two lateral portions are welded together along lines 332 and 333.

Figure 8:
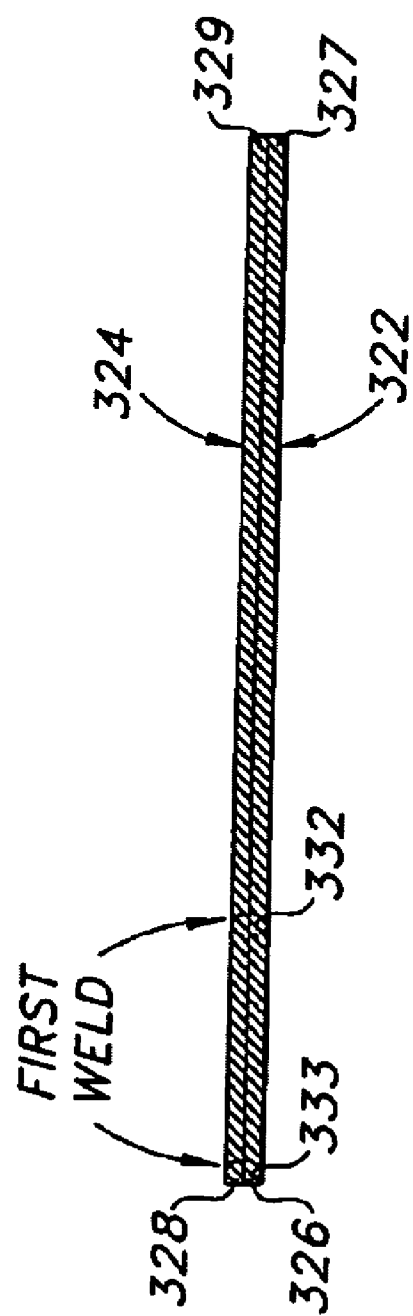
FIG. 8 is a sectional view similar to FIG. 7 but in a first intermediate step of manufacture.
Figure 9:
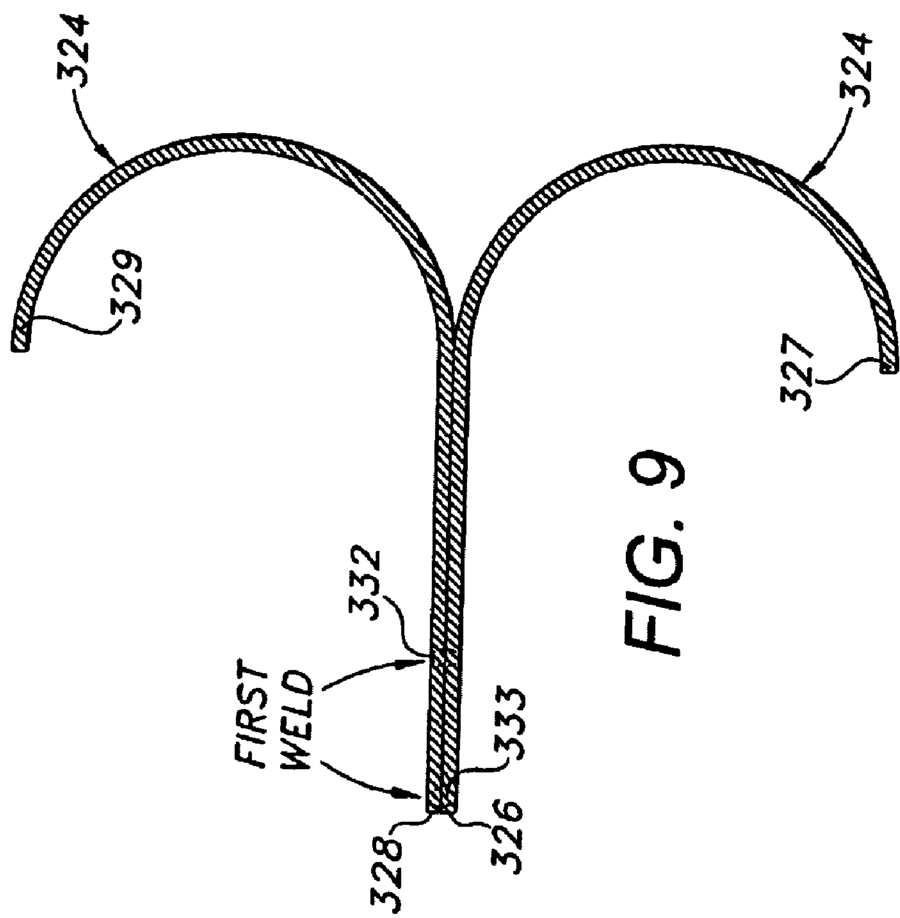
FIG. 9 is a sectional view similar to FIG. 7 but in a second intermediate step of manufacture.

FIGS. 8 and 9 show two intermediate steps in fabricating the beam portion 312 illustrated in FIG. 7. In FIG. 8, the two lateral portions 322 and 324 are pieces of flat stock laid against one another. The two pieces are welded or otherwise connected along lines 332 and 333. FIG. 9 illustrates a subsequent step in which the two lateral portions 322 and 324 are being formed into their closed configurations. Ultimately, the lateral edges 327 and 329 engage lateral edges 326 and 328 respectively and are welded thereto to complete the beam portion 312 illustrated in FIG. 7.

V. Conclusion

In all of the described embodiments, the profile of the beam portion is relatively small, and yet the beam meets or exceeds governmental regulations and vehicle manufacturer requirements. Also, door beams constructed in accordance with the present invention can be longer than those of the prior art. When roll formed, the door beams can be given a "sweep" or curve. Further when roll formed, the mounting brackets are relatively wide, providing increased surface attachment area. All of these advantages enable the present door beam to be used in a variety of applications in which prior art beams cannot be used. Therefore, the present invention enables a wider variety of vehicle door designs.

The above descriptions are those of preferred embodiments of the invention. Various alterations and changes can be made without departing from the spirit and broader aspects of the invention as defined in the appended claims, which are to be interpreted in accordance with the principles of patent law, including the doctrine of equivalents.

What is claimed is:

1. A one-piece vehicle door beam comprising:

an elongated beam portion having opposite ends, said beam portion including a lateral middle portion and first and second lateral portions extending therefrom, each said lateral portion including a perpendicular portion perpendicular to said middle portion and a transition portion curving continuously from said middle portion to said perpendicular portion, said first and second lateral portions terminating in first and second lateral edges, said first lateral portion shaped so that said first lateral edge abuts said middle portion, said second lateral portion shaped so that said second lateral edge abuts said middle portion, said perpendicular portions engaging each other, said first and second lateral edges being connected along their lengths to said middle portion; and first and second brackets unitary with and extending from said beam portion, said brackets adapted for attachment to a vehicle door.

2. The vehicle door beam as defined in claim 1 wherein said first and second lateral portions are of similar size and shape.

3. The vehicle door beam as defined in claim 1 wherein said first and second lateral portions are connected to one another along a line separate from said first and second lateral edges.

4. A vehicle door beam comprising:

an elongated beam portion having opposite ends, said beam portion including a first lateral portion having a first lateral edge abutting said beam portion, said first lateral edge welded along its longitudinal extent to said beam portion to form at least part of a first closed configuration, said beam portion further including a second lateral portion having a second lateral edge abutting said beam portion, said second lateral edge welded along its longitudinal extent to said beam portion to form at least part of a second closed configuration; and a pair of bracket portions extending from the opposite ends of said elongated beam portion and adapted for attachment to a vehicle door.

5. The vehicle door beam as defined in claim 4 wherein said beam portion and said bracket portions are parts of a single unitary piece.

6. The vehicle door beam as defined in claim 5 wherein:

said beam portion includes a lateral center portion; and said first and second lateral edges abut said beam portion at said lateral center portion.

7. The vehicle door beam as defined in claim 5 wherein said first and second lateral portions are connected to one another along a line separate from said first and second lateral edges.

8. The vehicle door beam as defined in claim 4 wherein:

said beam portion includes a web and a leg, said leg having first and second leg edges, said first leg edge connected to said web, said leg forming part of both of said first and second closed configurations.

9. The vehicle door beam as defined in claim 8 wherein said first and second lateral edges are connected to said second leg edge.

10. A vehicle door beam as defined in claim 8 wherein said first lateral edge is connected to said second leg edge.

11. A vehicle door beam as defined in claim 4 wherein said first and second lateral portions are separate pieces connected to one another.

* * * * *